(No Model.)

J. FORSYTHE.
ROTARY ENGINE.

No. 335,120. Patented Feb. 2, 1886.

WITNESSES
N. P. Potter
H. L. Castle

INVENTOR
Joseph Forsythe

UNITED STATES PATENT OFFICE.

JOSEPH FORSYTHE, OF PITTSBURG, PENNSYLVANIA.

ROTARY ENGINE.

SPECIFICATION forming part of Letters Patent No. 335,120, dated February 2, 1886.

Application filed June 22, 1885. Serial No. 169,370. (No model.)

*To all whom it may concern:*

Be it known that I, JOSEPH FORSYTHE, a citizen of the United States, residing in the city of Pittsburg, county of Allegheny, and State of Pennsylvania, have invented certain new and useful Improvements in Rotary Engines, the following being a description thereof, reference being had to the accompanying drawings, which form part of this specification.

This invention relates to rotary engines, specially adapted to the development, application, or utilization of steam-power; and it consists in the peculiar conformation, combination, and operation of the cylinder, piston, and valves, and their parts, respectively.

Figure 1:
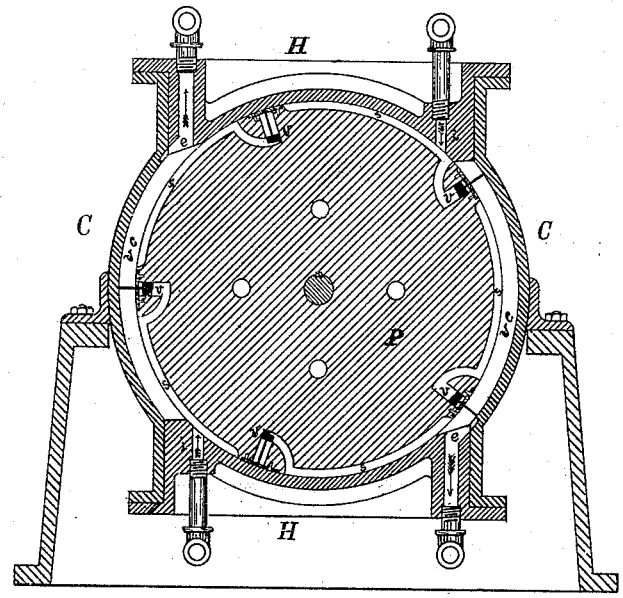
Figure 2:
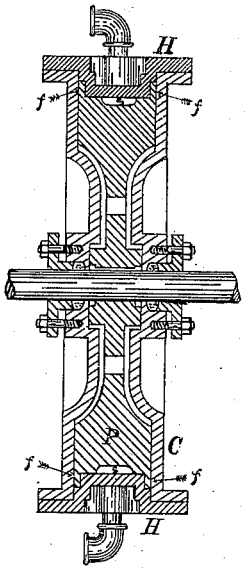
Figure 3:
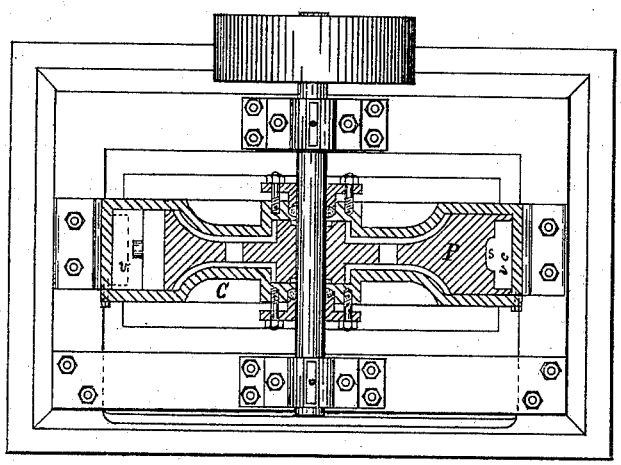

Figure 1 represents a vertical section of engine. Fig. 2 represents a vertical section of cylinder transverse to Fig. 1, showing the head in place between the flanges of the piston. Fig. 3 represents a horizontal section of engine.

The nature of my invention will be readily understood from the following description, taken in connection with the accompanying drawings.

This engine, not to speak of bed-plate, journals, &c., consists of a hollow cylinder, C, in one piece with one of its bases, the other base—*i. e.*, the cap—being made separate and bolted on, both bases perforated at centers for shaft of piston, and having proper stuffing-boxes at perforations around shaft to prevent leakage. This cylinder has affixed to or set in its concave surface, at opposite sides, two heads, H, sufficiently separated from its bases to permit the intervention of the flanges of the piston. These heads are pierced to vent *i* from their concave surfaces into grooves or slots in the convex body of the piston, and are sufficiently long to prevent the steam escaping backward into the valve-circle. Each head has on one side an influent way, *i*, into the valve-circle *v c*, and on the other side an effluent or exhaust way, *e*, from the valve-circle.

The piston P is spool-shaped, the spool being hollowed at ends for reduction of friction-surface, and pierced with holes from end to end for equalization of pressure on ends.

The flanges *f* (shown in Fig. 2) of this piston intervene between the heads and the bases of the cylinder, reaching the concave surface of the cylinder. These flanges are cut across radially parallel to the axis of the spool or piston, to make slides for the valves, down to the convex surface of the body of the piston, and thence the cut reaching from end to end, extends into the body of the piston toward its axis, to form recesses for the valves. Each recess has, when desired to give greater driving-surface to the valve, a barrel bored in for the insertion of a piston behind the valve, the barrel being closed from the valve-circle by caps bolted on, so fitting that the valve slides freely between. Each of these recesses has also on the side of the valve last passing the heads and in the convex surface of the body of the piston, a groove or slot, *s*, formed to catch the steam venting from the concave surface of the head, and thence a valve way to conduct it to the valve-retreat and barrel back of the valve.

As to its mode of operation, this engine works as follows: The steam or other power medium is introduced by the influent way through the fixed head into any slot in opposition, passes thence by the valveway to the valve-barrel and recess back of the valve, and forces out the valve, which in its outward motion is regulated by the line defined by the fixed head to prevent shock, into the valve-circle in front of and in opposition to the fixed head, where it acts as a piston or moving head, and the steam, &c., being thus confined between the valve or moving head of a rotary piston and the fixed head of a stationary cylinder, the piston is forced into revolution, the revolution bringing another valve into operation in like manner, as described, and each valve as it approaches the other fixed head is first eased of its pressure by the steam, &c., escaping out at the effluent or exhaust way, and then by the revolution of the piston borne against the longer incline of the other head, and by its resistance to its further passage pressed back into its recess.

I claim as my invention—

In a rotary steam-engine, a stationary cylinder having one or more fixed heads, each head having inclines and influent and effluent ways, in combination with a rotating piston provided with three or more concentric segmental slots in its convex surface, so arranged as to admit steam first to valve-recesses to drive out valves, and then into valve-circle between fixed head and valves; also, to transmit steam exhausting back from valve-recess, substantially as described and shown.

In witness whereof I hereto sign my name.

JOSEPH FORSYTHE.

Witnesses:
W. P. POTTER,
H. L. CASTLE.